Feb. 24, 1931.   J. G. COLLINS   1,794,148
WRECKING CRANE
Filed Sept. 21, 1928
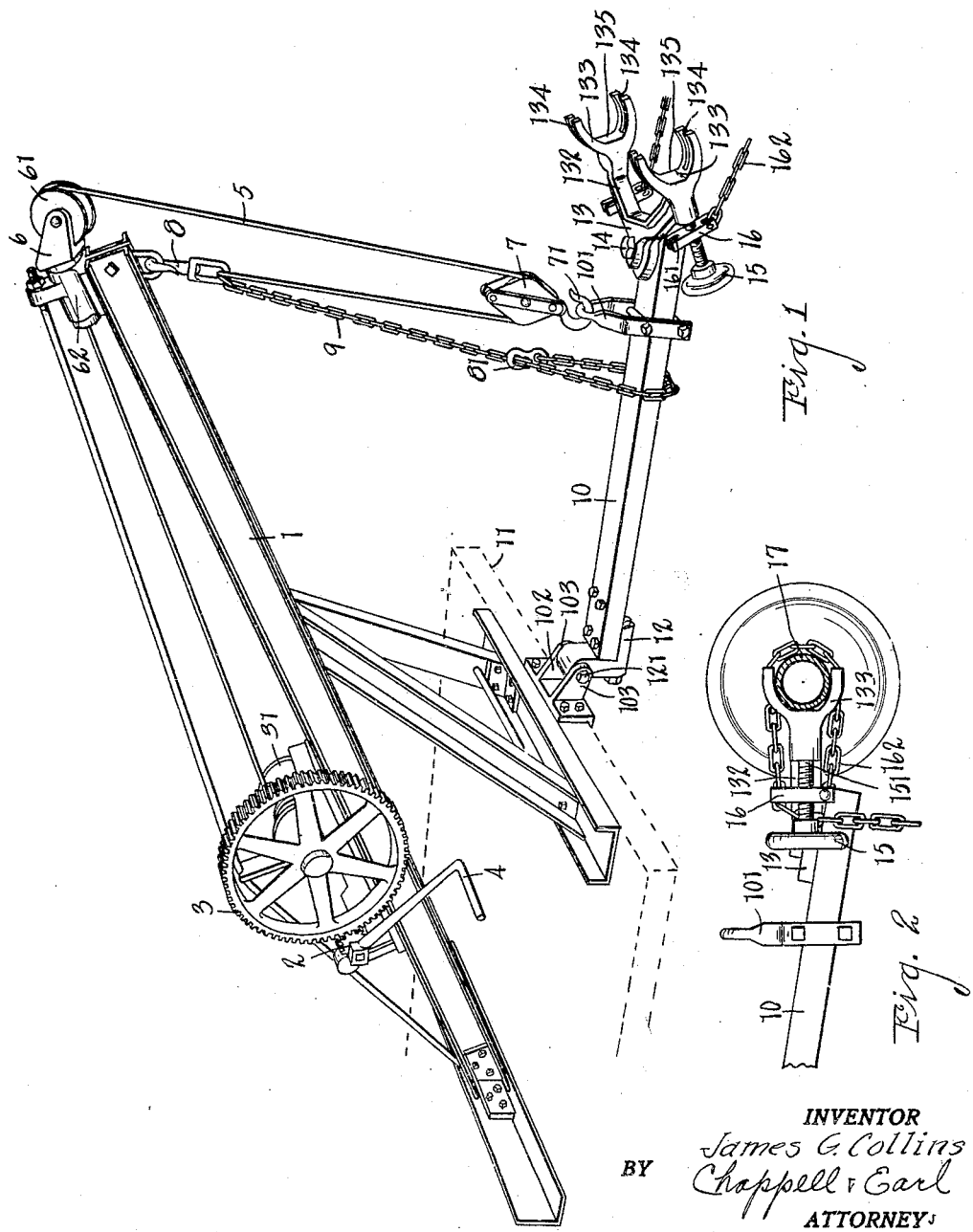
INVENTOR
James G. Collins
BY Chappell & Earl
ATTORNEYS Patented Feb. 24, 1931

1,794,148

UNITED STATES PATENT OFFICE

JAMES G. COLLINS, OF KALAMAZOO, MICHIGAN, ASSIGNOR TO ATLAS PRESS COMPANY, OF KALAMAZOO, MICHIGAN

WRECKING CRANE

Application filed September 21, 1928. Serial No. 307,371.

The main objects of this invention are:

First, to provide an improved combination means of supporting the wrecked car when in the towing operation, thereby relieving the strain on the lifting cable.

Second, to provide an improved swiveling guide pulley means for the cable.

Third, to provide an improved cradle combination for attaching the bar to the axle of a wrecked car.

Objects pertaining to details and economies of construction and operation will definitely appear from the description to follow.

The invention is clearly defined in the claim. A structure embodying my invention is illustrated in the accompanying drawing, in which:

Fig. 1 is a perspective view of my improved crane distance bar and cradle, the parts being arranged in a position as they would be in the towing operation. A portion of the cradle securing chains is broken away. The platform of the truck is shown in dotted lines.

Fig. 2 is a cross section of the cradle connection secured to the axle of a car that is being towed.

The parts will be identified by their numerals of reference which are the same in all views.

1 is a crane of the standard type. 2 is a main driving pinion. 3 is the driven gear on the winch 31. 4 is a crank for operating. 5 is the hoist cable. 6 is a hollow swivel for pulley 61 supported in head block 62 carried by the crane beam. 7 is the sheave for the cable with hook 71. 8 is the cable attaching hook to secure the end of the cable to the beam after it is run through the sheave 7. 9 is a safety chain carried by the cable hook 8 and is provided with grab hook 81.

10 is the distance bar formed of channel iron provided with a loop 101 for attachment of the sheave and cable, and is secured to the supporting hinge bracket 102 on the rear of the truck platform 11. 103 are the hinge ears projecting from the bracket 102.

12 is the hinged hanger having hinge bolt 121 through the ears 103. 13 is the cradle. 14 is the vertical pivot connection for the same to the rear end of the distance bar 10. 132 are outwardly extending bifurcated arms. 133 are forks at the ends thereof for embracing the axle of a car. 134 are slots in the forks for retaining the attaching chains. 135 is a socket portion for each fork at the center thereof. 15 is a hand screw pivoted in said fork at 151. 16 is a chain carrying bar for each fork screw threaded on screw 15 and having its ends slotted at 161. The clamping chain 162 is secured to the other end of said bar. 17 is the axle housing of the vehicle that is being towed.

With the parts thus arranged the towing of a wrecked vehicle safely has been accomplished. When a disabled vehicle is to be pulled out of a ditch the distance bar can be dropped down to contact with the ground thereby providing a brace for the wrecking truck. To relieve the strain on the cable when the pull is from the side, a swivel 6 is provided on the end of the hoist beam, thereby keeping the pulley in proper alinement as to the position of the work to which the cable has been secured. This has been found to work very satisfactorily where a disabled car is in a ditch at the side of the road and where it is impossible for a wrecking crane to get a straight pull.

With this arrangement of a swivel the strain on the cable is reduced to a minimum in towing a vehicle. The distance bar 10 pivoted to the truck is lowered to the level of the axle of the wrecked car. This allows the forks 133 on the cradle 13 to embrace the axle 17 at each side of the center. The chains 162 are then passed around the axle and one link secured in the slot 161 of the chain bar. The screw 15 is then tightened to effectively clamp the axle. The car is then hoisted by the cable, the safety chain is passed around the distance bar and secured by grab hook 81. This relieves the strain on the cable which may be relaxed.

Having thus described my invention, what I claim as new and desire to secure by Letters Patent, is:

In a wrecking crane and cradle, the combination with a crane beam and supports, of a winch and cable therefor, a hollow swivel guide pulley for said cable at the upper end of said beam to permit the pulley to turn on said swivel, a hook sheave, a distance bar, a hinge bracket support for said bar, a cradle comprising a bifurcated yoke on a vertical pivot at the outer end of said distance bar, attaching forks with central socket shank and slotted arms, a handscrew pivoted in each socket, a screw threaded chain bar on said handscrew with chain slot at one end, and a chain attached at the opposite end and adapted to wrap around an axle and engage the slot in said bar, as described.

In witness whereof I have hereunto set my hand.

JAMES G. COLLINS.